(12) United States Patent
Mertens

(10) Patent No.: US 9,749,550 B2
(45) Date of Patent: Aug. 29, 2017

(54) APPARATUS AND METHOD FOR TUNING AN AUDIOVISUAL SYSTEM TO VIEWER ATTENTION LEVEL

(71) Applicant: Koninklijke Philips N.V., Eindhoven (NL)

(72) Inventor: Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/037,492

(22) Filed: Sep. 26, 2013

(65) Prior Publication Data

US 2014/0022459 A1    Jan. 23, 2014

Related U.S. Application Data

(62) Division of application No. 12/994,182, filed as application No. PCT/IB2009/052245 on May 28, 2009, now Pat. No. 9,032,472.

(30) Foreign Application Priority Data

Jun. 2, 2008 (EP) .................................... 08157411

(51) Int. Cl.
*H04N 21/431* (2011.01)
*H04N 21/432* (2011.01)
(Continued)

(52) U.S. Cl.
CPC ......... *H04N 5/2625* (2013.01); *G11B 27/031* (2013.01); *G11B 27/10* (2013.01);
(Continued)

(58) Field of Classification Search
CPC ........... H04N 21/4318; H04N 21/4325; H04N 21/4358
(Continued)

(56) References Cited

U.S. PATENT DOCUMENTS 5,986,200 A   11/1999  Curtin
6,873,710 B1  3/2005   Cohen-Solal et al.
(Continued)

FOREIGN PATENT DOCUMENTS

EP    0681398 A2   11/1995
EP    1505488 A1    2/2005
(Continued)

OTHER PUBLICATIONS

Beric et al: "Towards an Efficient High Quality Picture-Rate Up-Converter"; Proceedings of the 2003 International Conference on Image Processing, Sep. 14-17, Sep. 2003, vol. 3, pp. 363-366.
(Continued)

*Primary Examiner* — Dominic D Saltarelli

(57) ABSTRACT

An audiovisual signal processing device including a signal processing unit configured to receive a video signal comprising a plurality of images; identify at least first and second video components of the video signal, the first video component relating to motion of the first video component between at least a first portion of the plurality of images and the second video component relating to a substantial lack of motion of the second video component between at least a second portion of the plurality of images; select at least one image from the second portion of the plurality of images including the second video component; and insert the first video component into a plurality of the selected at least one image to create a temporally repeating sequence of the at least one image including the first video component.

16 Claims, 3 Drawing Sheets

(51) Int. Cl.
*H04N 21/435* (2011.01)
*H04N 5/262* (2006.01)
*G11B 27/031* (2006.01)
*G11B 27/10* (2006.01)
*H04N 7/16* (2011.01)
*H04N 21/439* (2011.01)
*H04N 21/44* (2011.01)
*H04N 21/4402* (2011.01)
*H04N 21/485* (2011.01)

(52) U.S. Cl.
CPC ......... *H04N 7/163* (2013.01); *H04N 21/4398* (2013.01); *H04N 21/4402* (2013.01); *H04N 21/44008* (2013.01); *H04N 21/485* (2013.01); *H04N 21/4852* (2013.01)

(58) Field of Classification Search
USPC .................................. 725/136, 140, 142, 151
See application file for complete search history.

(56) References Cited

U.S. PATENT DOCUMENTS

| | | | |
|---|---|---|---|
| 7,284,201 | B2 | 10/2007 | Cohen-Solal |
| 7,627,880 | B2 | 12/2009 | Itakura |
| 7,882,522 | B2 | 2/2011 | Neufeld et al. |
| 8,205,237 | B2 | 6/2012 | Cox |
| 2002/0016962 | A1 | 2/2002 | Decarmo |
| 2007/0296814 | A1* | 12/2007 | Cooper et al. ............... 348/143 |
| 2008/0320546 | A1* | 12/2008 | Moon et al. ................. 725/136 |

FOREIGN PATENT DOCUMENTS

| | | |
|---|---|---|
| GB | 2381117 A | 4/2003 |
| JP | H09247563 A | 9/1997 |
| JP | 2001078117 A | 3/2001 |
| JP | 2001109499 A | 4/2001 |
| JP | 20001515675 A | 9/2001 |
| JP | 2002084495 | 3/2002 |
| JP | 2003032583 A | 1/2003 |
| JP | 2004039202 | 2/2004 |
| JP | 2004236074 | 8/2004 |
| JP | 2005303879 A | 10/2005 |
| JP | 2006287319 | 10/2006 |
| JP | 2006303657 A | 11/2006 |
| WO | 9842197 A | 10/1998 |
| WO | 0247067 A2 | 6/2002 |
| WO | 2004109467 A2 | 12/2004 |
| WO | 2007010481 A2 | 1/2007 |

OTHER PUBLICATIONS

Volinchak, T.: "Add Impact to Your Demos"; 7 Page Article on Home Recording Technology, Downloaded From http://www.yarbroughsmusic.com/ADD%20IMPACT%TO%20YOUR%20DEMOS.doc.

Smart Jukebox Features; Description of Windows Media Jukebox, 8 Page Document, Downloaded From, http://.microsoft.com/windows/windowsmedia/player/10/jukebox.aspx on Apr. 21, 2008.

Galbraith et al: "Variable Speed Playback of Digitally Recorded Lectures:Evaluating Learner Feedback"; Cener for Instructional Design, Brigham Young University, Dec. 2001, 10 Page Paper.

"Dedicated Devices Do It Better"; Wired Blogs, Downloaded on Apr. 21, 2008, on http://blog.wiredcom/music/2006/10/dedicated_devic.html, 7 page paper.

Wicke: "Effects of Music and Sound on Human Health:"; Herbalist Review, Issue 2002 #1, Dec. 8, 2002, 15 Page Document.

Sirota: 3d2f.com Software Directory, 5 Page Advertisement of Slowgold Jul. 7, 2004, Downloaded From http://3d2f.com/programs/14-019-slowgold-download.shtml on Apr. 21, 2008.

* cited by examiner

APPARATUS AND METHOD FOR TUNING AN AUDIOVISUAL SYSTEM TO VIEWER ATTENTION LEVEL

CROSS-REFERENCE TO RELATED APPLICATIONS

This application claims the benefit or priority of and describes the relationships between the following applications: wherein this application is divisional of prior U.S. patent application Ser. No. 12/994,182, filed Nov. 23, 2010, which is a national application of PCT Application No. PCT/2009/052245, filed May 28, 2009 and claims the benefit of European Patent Application No. 08157411.3, filed Jun. 2, 2008, the entire contents of each of which are incorporated herein by reference thereto.

FIELD OF THE INVENTION

The invention relates to an audiovisual signal processing arrangement and method and software for processing audiovisual signals so that they become easier to digest, e.g. it becomes easier to pick up the message.

BACKGROUND OF THE INVENTION

Audiovisual systems for the presentation of audiovisual content such as e.g. broadcast television are becoming increasingly information-dense, due to techniques such as e.g.: information packing, e.g. with tightly cut short interviews or explanation clips (only the most relevant sentences of a news local reporting are retained, making this a rather short synthesis of the topic, demanding of the viewer careful attention to all the statements), viewer attention grabbing, e.g. playing with the sound level, multi-window video (e.g. three subwindows showing different aspects of the same program part, such as e.g. two interviewers simultaneously running to their next person to interview, or additional text banners), etc.

This is very demanding to a viewer, and one can understand that especially after a hard day at work, at least some people will have problems to attentively follow, or even follow at all, certain programs. In limit cases, such a program may even become merely a stress factor rather than being informative or amusing.

It is believed with the increase in audiovisual content, and the merging of several novel audiovisual technologies—e.g. internet on television—that these problems will aggravate.

It is an object of the invention to provide a system that is more responsive to viewer's needs as regards their presentation of their audiovisual information.

SUMMARY OF THE INVENTION

A solution inspired by the object is realized by an audiovisual signal processing arrangement (104, 106), comprising an audiovisual signal processing unit (104) arranged to receive from a control unit (106) at least one complexity setting value (S_Inf-c) specifying a complexity of information in an audiovisual signal, the audiovisual signal processing unit (104) being arranged to process an inputted audiovisual signal S(A,V) to decrease or increase its information complexity as determined by the complexity setting value (S_Inf-c), wherein the audiovisual signal processing unit (104) is arranged to process at least an audio component (A) of the audiovisual signal S(A,V), or arranged to process at least one video component (V) and corresponding methods.

E.g. tired or elderly people can specify a setting of information complexity (i.e. the density, and the way information is presented to a viewer), e.g. as a preset for absolute comparison, or a relative value on a slider, and the audiovisual system can adapt the characteristics of the video and/or the audio so that the information complexity becomes less and the program easier to follow. Whereas ideally the entire discussion would need to be changed—e.g. remove difficult words—already with some simple audiovisual signal processing a lot can be achieved, depending on the input signal. E.g., the present method (/arrangement) is particularly suitable for programs with interspersed "reportage" items, such as e.g. the news, a talk show, or a quiz (in this case the questions have their own movie clips), etc., i.e. typically hierarchical information presentation (introduction with main information versus particular details). It becomes then possible to treat the different levels in the hierarchy, i.e. the different temporal intervals [interval in this application shall mean an amount of continuous time from a start time to an end time, and/or the audio and/or video and/or other data for that interval], differently, e.g. by skipping more transmitted or stored information for the lesser relevant details, or vice versa, only retaining the reportages, as a kind of atmosphere setting movie (e.g. the processing unit may be configured to for a travel program cut out the boring in between talks and only retain the landscape pans in a slide show). It will be less suitable for movies, since the director has already optimized those for a desired effect. In between however, documentaries may also be good candidates for processing. E.g., in a travel program, the audio may be satisfactory, but the video may be very fastly cut, and consisting for a great part of fast moving blurry pans, which make it become difficult to watch, and the viewer may even be distracted from the audio. A pure video processing could be e.g.—in the extreme—a slideshow of repeated extracted stills, or less extreme a motion-based jitter removal and sharpening.

It is advantageous if—whether together with video processing or not—the different aspects of audio leading to complexity, and hence the easiness of a viewer to follow and understand the program, are simultaneously optimized (or differentially changed a certain amount with a relative setting). E.g., which kind of voice speaks (a high pitched lady voice versus a calm deep male voice) will by some viewers be judged as important as speaking tempo (the number of words per unit of time).

Since in general there will be some buffering involved, the present arrangement (e.g. typically embodied in a signal processing IC) will advantageously be incorporated in e.g. a hard disk recording or PC for offline viewing (examples of rendering apparatuses 102), but it may also be incorporated in a digital television, and used during real-time viewing. In this case one could when having a tempo slow down buffer the entire incoming program, or resynchronize at a new item, i.e. skip some content.

I.e., whatever the source or presentation of the audiovisual signal, with the present invention the viewer can, with relatively simple control commands, adapt the audiovisual signal to his present attention level.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept, and in which dashes are used to indicate that a component is optional, non-dashed components not necessarily being essential. Dashes can also be used for indicating that elements, which are explained to be essential, are hidden in the interior of an object, or for intangible things such as e.g. electromagnetic fields.

In the drawings.

DETAILED DESCRIPTION OF THE DRAWINGS

Figure 1:
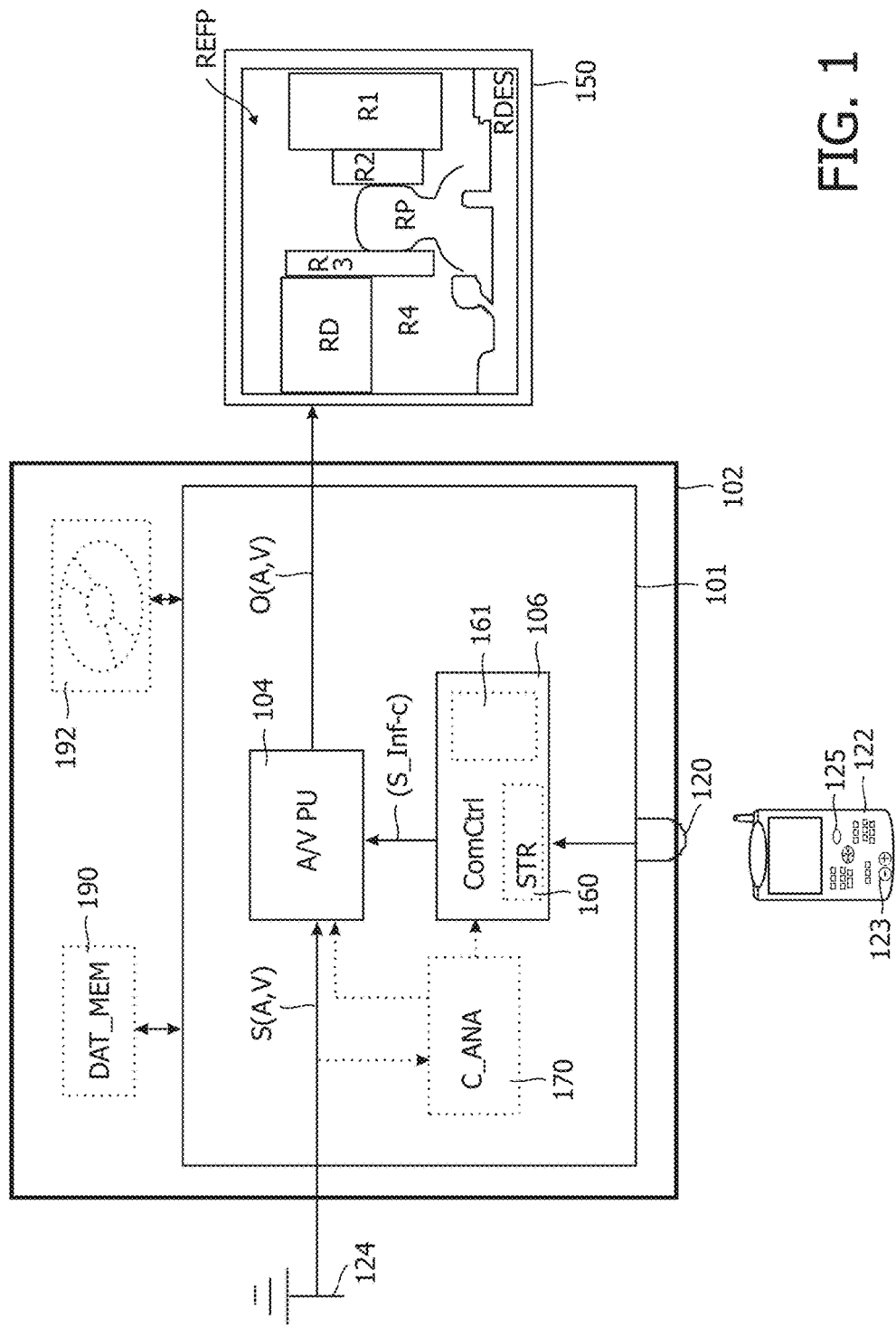
FIG. 1 schematically illustrates the audiovisual signal processing arrangement by way of example incorporated in an audiovisual signal storage capable device (102)

FIG. 1 shows an audiovisual (A/V) signal processing unit 104, which is arranged to apply several signal transformations to an inputted A/V signal S(A,V), e.g. via broadcast antenna 124, or internet cable, etc. In its simplest configuration it will apply transformations only to the audio, however, sometimes for increased quality (such as lip sync) it may be advantageous to have it apply at least some video processing such as picture repetition. Such specifications of the different algorithms and in particular their correspondence can be either factory set (and partially not changeable), signal-dependent, or user-specified (see below, however, the user should with the configuration menu only be bothered with issues that are relevant, such as the jitter or speed of the video, and not technical issues such as whether a particular motion-compensated interpolation is to be used). The A/V processing unit 104 performs its signal transformations under the control of a complexity setting (i.e. at least one, and possibly several, e.g. a different single value for the audio and the video) value, specifying/characterizing complexity of an audiovisual signal, obtained from a control unit 106, which may be connected to viewer input (e.g. via a communication input 120 to a remote control 122), or behave automatically as a controller tailoring/maintaining the input A/V signal to a desired complexity, e.g. stored by the viewer in a memory at first use of the system (e.g. an absolute value such as words per minute and maximal dynamic of the audio).

It will be very comfortable for a viewer if he can modify the signal in steps, as if he was changing the volume control, namely with plus and minus buttons 123 on his remote control.

Typically the user will want to push the minus button, because he thinks the program is (currently) to hectic, and he starts missing at least some information.

Changing the amount of words per minute can be done in a number of ways. Since speech typically contains pauses between words, the A/V processing unit (PU) can be configured to lengthen these pauses, which results in slower speech. Alternatively or additionally, it could also apply overlap-and-add techniques like PSOLA. It will be understood that combining different audio transformations in a single complexity-influencing transformation (with a single slider 330 setting) not only simplifies control for the viewer, but can also lead to better results. E.g., emphasis on certain words (either by analyzing the A/V signal, e.g. news readers oftentimes move their head when speaking important things, or even by recognizing certain words like "the" and emphasizing other words, or emphasizing certain important (e.g. speech logic) words like "and", "secondly", or even just processing the voiced sounds, leaving the fricatives unchanged) may become less important if the tempo of the speech is lower.

Changing the volume of temporal parts of the audio may relate to a simple reduction of the longer term dynamics (e.g. removing harder speech, and setting all speech close to a common volume level, or vice versa modulating the levels—e.g. between longer silences, indicating sentences—to make the story more interesting). Or it may relate to emphasizing certain words, etc.

Also the voice of the speaker may be changed by the A/V PU. This can be done with very complicated vocal tract modeling, but since the vocal tract is typically modeled by a filter on the input of the vocal cords, the coloring can also be done with relatively simple spectral operations, i.e. e.g. increasing the volume in particular bands, which either contributes to intelligibility or pleasantness of the voice. Although it is not necessary to perfectly and fully convert e.g. a high pitched male voice to a calm and deep male voice, the preference of the user for such deep voices (see configuration window FIG. 3, 350) may be realized e.g. simply with a boosting of the low frequencies of the speech. In case of other, background noises, speech separation techniques may be used.

So typically, when the user pushes the minus button, to have a calmer more comprehensive audio presentation, the audio processing will move in a number of steps the speech through characteristics phase space from {fast, jumpy, high pitched} to {slow, monotone, low pitched}, at least if that are the settings of the preferential change direction for late night viewing for that particular viewer.

If the slider 330 is not a relative slider, it will not be set a 50% initially, but rather the signal analysis unit will measure the properties of the audio (and/or video) signal and put the position of the incoming arrow accordingly. Thereto, according to the algorithm model, in factory a number of typical programs are analyzed, and any program of at least X words together (e.g. also coupled to whether a second speaker often interferes, whether there is background noise, type of speaker, . . . ) is represented with the "too hectic" code, i.e. corresponding to slider position 100%. Similarly, some of the programs at or below a certain complexity will be too boring and all characterized as absolute complexity value 0%. The signals of in-between measurements are linearly or non-linearly mapped on the different in-between values of the slider. In this case the viewer can set absolute settings for the complexity, although in practice in both systems he will typically arrive at some general preferred setting. Typically he will store those values in a viewer-characterizing memory 161, which will store a single value to transform all programs to, preferably dependent on the time of day, and possibly on the type of program (news having other settings than documentary, so that the arrangement can then automatically perform the desired A/V signal processing. Instead of having to go to a menu and choose the setting "tired evening", "morning wake-up" etc., the arrangement comprises software in the control unit 106 to present the slider 330 as a user-adapted slider. In this case, e.g. the 50% setting is the "general viewing" complexity (as inputted as preferred by the current viewer; there may be viewer identification means incorporated, such as e.g. keyword input, biometrics measurement, etc.), and a single minus button push moves to the "tired evening" preferred settings, a plus push to the "morning wake-up" settings, two minus pushes to the "late night" settings, etc., depending on the amount of optimal scenarios specified in a configuration phase by the viewer and their relative complexities (i.e. they are now in non-numerical order, even if "late evening" is 5 times more relaxed than "tired evening", a single push is enough).

Typically, making the signal less complex, there may be some slowing down involved. This on the one hand—if no precautions are taken—may either lead to skipping some content, or even having to watch for a longer time (e.g. when viewing from a hard disk 192 or solid state memory), but on the other hand, it may be desirable to also lengthen the video to keep A/V sync. It should be understood that—depending on its set-up configuration—the arrangement (the A/V PU) may have one or two of the following different video modification capacities. On the one hand it can process the video making it less complex, while retaining the total duration (e.g. by removing shaky motion, or converting a fast pan to a slower pan of lesser pan magnitude with the same temporal duration by motion-compensated interpolation, or smoothing scene changes, or changing the video dynamics, like removing flashes, or doing a temporal histogram modification, etc.). On the other hand it can change the duration of the video by adding (e.g. repeating) or skipping pictures. E.g. the last couple of pictures of a shot can be removed, while slowing (time-stretching) the first few (in the most extreme case just a single picture is retained). Preferably, to retain temporal smoothness, motion-based interpolation is used (I.e. the in between pictures are synthesized so that all objects are in their expected positions), e.g. the "3DRS natural motion" system of Philips (see e.g.: A. Beric, et al.: 'Towards an efficient high quality picture-rate up-converter', Proc. ICIP03, IEEE International Conference on Image Processing, Barcelona, Spain, Sep. 14-17, 2003). Depending on such aspects as e.g. the type of program (news vs. documentary), a lesser degree of continuous sync is necessary. Even, a full shot may be omitted, especially if it is of short duration, and because of the fast cut directing, there are many shots of the same location/scene. In general the A/V PU may be configured somewhere from tightly controlling the sync between audio and video to changing their complexity and in particular their tempo completely independently (e.g. in documentaries oftentimes the video is only illuminating/supporting the told story, and can be changed independently without introducing artefacts). Analysis of the temporal correlation between snippets of the audio and video can help in detecting the type of program and necessary sync.

Figure 3:
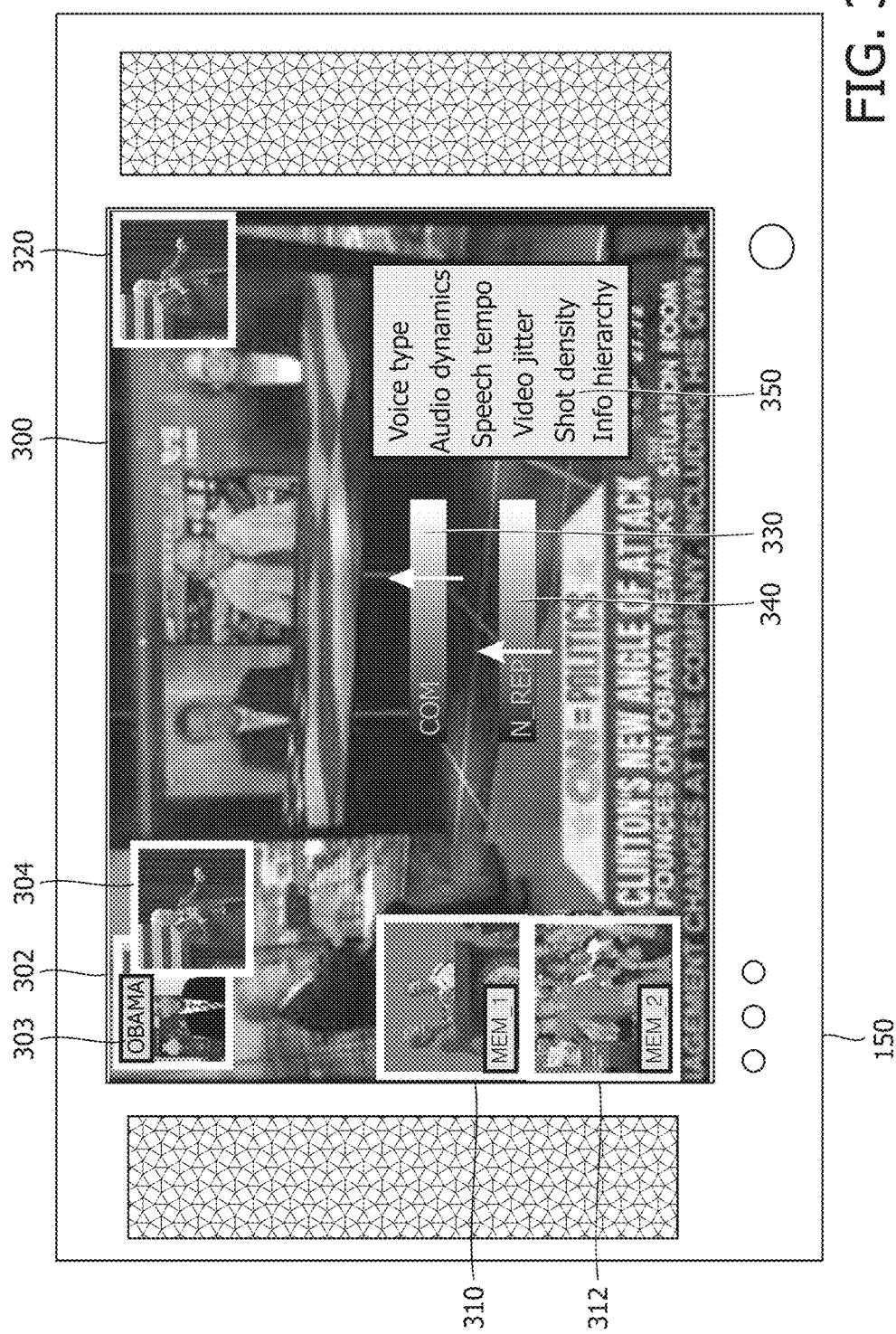
FIG. 3 schematically shows an exemplary look on a display of a composited output audiovisual signal making an input audiovisual signal less complex and easier to follow.

It is advantageous if the arrangement is arranged to offer the option of not necessarily loosing any information, even after slowing the pace. Thereto, the A/V PU may be arranged to do a particular kind of video processing, to create a hierarchically structured output audiovisual signal O(A,V) as illustrated in FIG. 3. In this view, the different temporal subparts of the A/V signal are presented in a list of subwindows 302, 304, . . . . The main view is the part of the A/V signal currently watched, and in window 302 is another part, typically still to come in the future. So the viewer, instead of running out of time and loosing this part 302, can select it and thereby skipping the current part, thereby moving this subsequence to the main window 300. A number (depending on how long the delay is and the coarseness of scene selection and/or how many the viewer wants to see, etc.) of these parts are superimposed on the main window (in a first row left to right, then a second row, etc., until we get something like a comic book, in which the relevant action moments are actually moving). In a more intelligent placing system, the subwindows do not follow a rectangular grid, but are placed according to the underlying picture, so as to not cover too much of it, and as to placement, so as to not cover a video subwindow (by analysis of the variation of picture data in a region between lines) such as the lady interviewee, not covering people, or logos, banners, etc. Although these parts 302 may be selected at random, e.g. each one a minute apart, it is advantageous if they are really meaningful temporal subsequences (such as the (first pictures of) reportages, running concurrently on top of the main video).

Figure 2:
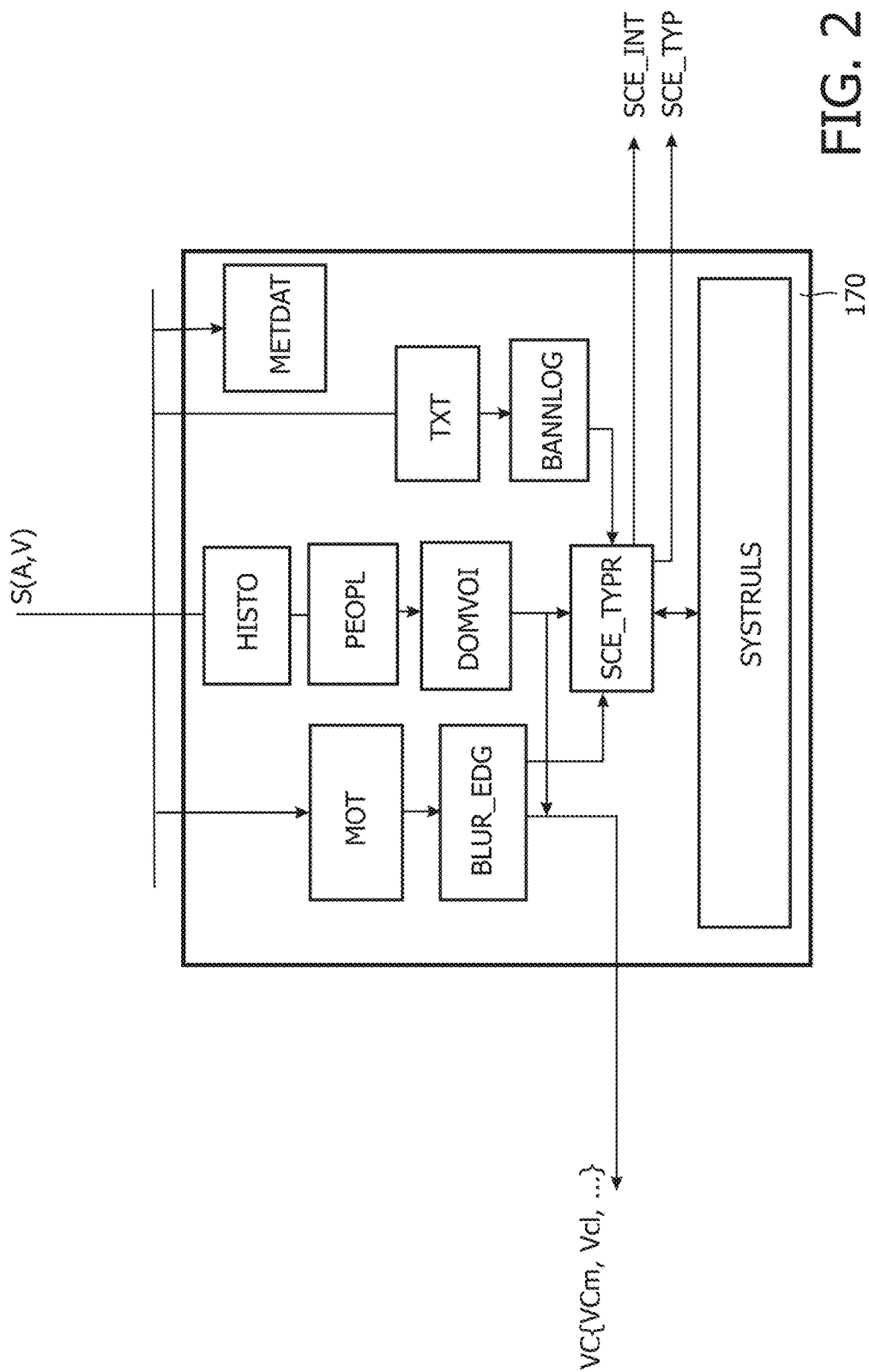
FIG. 2 schematically shows in more detail embodiments for audiovisual signal analysis units.

Thereto the signal analysis unit 170 may be arranged to e.g. distinguish the news speaker from the on-the-spot reportages and show those reportages in the subwindows 302, 304, etc. Exemplary embodiments of such an analysis unit are illustrated with FIG. 2.

A motion analyzer MOT evaluates the motion in the picture, e.g. global panning and zooming, but also the motion of different objects. So it can track an object and check e.g. how it changes color etc. E.g. the motion analyzer can help in addition to the people analyzer PEOPL. People analyzers are known perse, and may comprise such components as pose analyzers, eye or gaze analyzers, head analyzers or recognizers etc. So it can be checked whether a (part of) person is present, or even which person or what he is doing. But also, interviewers are typically areas of intermediate, relatively little motion (especially the trunk). So the motion analyzer can help in the analysis (characterization of aspects) and/or classification of regions such as person region RP, FIG. 1, and allow a less complex people analyzer. Especially of interest is tracking the speaking person's head, as he tends to e.g. nod to emphasize an important word (the volume of which can then be increased by the audio processor).

The people regions are also input for the scene analyzer SCE_TYPR (in this schematic illustration we assume that all higher analysis is done in this block, although the skilled person will understand that of course e.g. also the histogram analyzer HISTO or dominant voice analyzer DOMVOI can determine a particular content interval), since e.g. a news program is usually with one presenter, whereas a general interest item show or debate may have 2 to 3. In any case it should be clear that the complexity of the program will oftentimes depend on the number of speakers, which will be reflected in the processing rules for determining A/V signal complexity. Although the scene analyzer may be a hardware block, we currently assume it is a general processor, typically running software coding rules SYSTRULS regarding the composition of audiovisual signals, which may be updated e.g. from internet.

The motion analyzer MOT in addition to the spatial image/video properties analyzer BLUR_EDG, which may involve such analysis like global or local blur determination, determination of edges and measures therefrom, etc., will give useful information e.g. to stabilize a jittery captured image. The measurements from these units will typically be output in a complexity vector VC, comprising several components. E.g., VCm is a total measure indicating an amount of motion in the picture, which may be further specified by more detailistic parameters such as e.g. pan magnitude, motion variance over time etc. Similarly, VC1 is a measure of how annoyingly fast the luminance of the scene or comprised objects varies, etc.

These parameters will typically match with parameters of the processing algorithms of the A/V PU, e.g. the pan may be two times too fast and result in a doubling of the pictures via motion-compensated interpolation. Also, one can derive therefrom a single complexity measure which together with the desired complexity S_Inf-c determines how much processing needs be done. Typically the amounts of each correction will happen internally without the user knowing it, e.g. he may in the configuration have specified his liking for several amounts of pan (× pixels per second is "slow", 2× is "confortable"/"general viewing", etc.), from which the arrangement can calculate the required compensation given the actual signal complexity and the desired one by simple mathematical interpolation.

Although also the other modules may contribute we briefly describe how PEOPL, HISTO, and DOMVOI may be used (separately or together for increased characterization fineness or robustness) to determine a scene interval SCE_MT, i.e. where either a shot or a scene (an number of similar shots) starts and ends.

Several measurements can be used to determine scene boundaries, from detection of black frames or wipes, to amount of bits required for coding the scene/shot. However, a very useful analysis is by looking at temporal changes or similarities of the spatial histogram, because this can help in extracting dominant shots(/scenes) (the generalization for the modern, hip programs of the dominant picture REFI, e.g. the typical view of a particular camera on the news reader in between reportages).

Often times such a camera will do only small zooms or pans, so there will always be the same picture around the news reader, i.e. that part of the studio (for modern virtual studio news it may be somewhat more complex since the news reader may be surrounding by very variable artificial pictures, although also in those cases there are usually identifiable elements like logos, color schemes, etc.). Thereto a spatial interpolation operation (panning and zooming) may be advantageous before analyzing the spatial histogram (e.g. based on characteristic features). E.g., the total picture may be cut into a number of rectangular blocks, and the colors therein present may be summarized, e.g. by means of the mean value. So one has a representation of the characteristic shot (the news studio), and it can be recognized each time it appears. Advantageously an embodiment of the arrangement will retain such shots if they occur often, especially at certain times, or correlated with certain metadata such as EPG information. Over time it can then store in a data memory 190 model data of such programs as e.g. the six-a-clock news, or doctor Phil. Therefrom the analysis unit can segment scenes of the news reader from the reportages, or scenes where the camera is on doctor Phil from where it is on a guest. The viewer slowly listening to all what doctor Phil is saying can then opt to click on the response of the guest in window 302 (typically with a "next snippet" button, or in a more advanced system by pointing with a remote control with camera), go straight to that, and the arrangement may then be arranged to display the Doctor Phil explanation from start to end in a "previous snippet window" 320, so that if the viewer thinks the doctor Phil advise or question was important afterall, he may continue to listen to that, either from (a little before) where he stopped, or from another time like the beginning of the segment.

Another useful characterization of the characteristic shot is the histogram of the surroundings of the speaker (e.g. one of the dominant speakers). One can make this position and size independent. E.g. one looks at regions of relatively similar colors (e.g. illumination can be discounted by segmenting regions of a narrow chroma histogram) around the speaker RP, i.e. R1, R2, . . . . One can model this scene e.g. with a matrix of the average value of the three left adjacent regions (R4, R4, R3) and right adjacent regions (R2, R1, R1) and do the same for below the person (where there often is an unchanging desk RDES), (RDES1, RDES2, . . . ) and above the person, so obtaining:

RD, RD, R3, R4,R4,R1, R1
R4, R4, R3, 0, R2, R1, R1
RDES1, RDES2, . . . .

Even for serious movement a lot of the elements will correlate. Note that the RD region can be discounted, since in the example it is a movie clip window, which can be detected from the variable and discontinuous content.

Having such a representation may also aid in detecting all shots from a scene (e.g. if the news reader is shot from different camera angles, the characterizing histogram colors of the studio will still to a certain degree occur in several shots, so these can be grouped in that the similarity measure of their value and occurrence is more close than e.g. for an interleaved street reporting or nature scene).

Note that a combination of spatial picture histogram analysis and dominant speaker recognition may as a stand-alone unit also be useful for other applications, e.g. content recognition for scene recognition Similarly, the identification of a dominant (or characteristic speaker) voice (i.e. a voice which occurs often in a certain time interval, and again in particular if it occurs at a certain time on different days) may aid not only in identifying whether the news reader is talking/introducing the next topic, but also e.g. in a documentary, whether the present information is more relevant—i.e. should e.g. be retained in the complexity-reduced/adjusted output A/V signal—or whether it are just illustrating scenic pictures.

Similarly, a text detector TXT, or a detector for special regions BANNLOG, such as e.g. a static logo, a banner etc., may aid in shot/scene segmentation (yielding the intervals SCE_INT) or identification (yielding types SCE_TYP). An more complex example than just the studio picture of the news reader of identification of what (SCE_TYP) the scene is, is e.g. a soccer match, which can be identified from a green rectangle, ball, a couple of players running around, an audience texture, and shouting sounds.

Lastly, it is interesting if metadata is present, e.g. from internet content. Not alone can this be used for shot/scene segmentation and identification, but also e.g. for characterizing the different hierarchical reportages (e.g. on subwindow 302 the text 303 OBAMA has been rendered, indicating to the user that this is a talk of Obama reportage. Consecutive scenes can also be hierarchically rendered, especially with the help of metadata, e.g. behind window 302 may be three subsequences: Obama's first, second and third argument. Depending on the viewer's interest and stamina, he can dive into several of those or not.

An interesting embodiment of the arrangement allows the viewer to store interesting temporal segments, e.g. to view them again later on. E.g. in a documentary one may first explain how big the market is for rubber tires, or Hillary may make a certain promise. Then when viewing the rest of the program, e.g. how expensive it is to make a tire, the viewer may quickly go back to that snippet to recapture the other fact relating to the total economics picture of the tire business. Thereto the viewer clicks a select button 125 anywhere in a shot/scene, and the entire scene start to end is copied to memory under control of selection unit 160 and shown in a first memory_window 310, and a second one 312 if the button is clicked again. These user-selected special sequences are organized vertically in the lower left corner of the displayed image on display 150, to distinguish them from the automatically generated ones 302, 304.

It is advantageous if the arrangement is arranged to handle commercial snippets differently. Commercial snippets are a good candidate to skip, but that won't be to the liking of the funding company. Thereto the A/V PU is arranged to summarize the commercial, and e.g. put it in its own subwindow. The maker of the commercial may add metadata for summarization, e.g. a few characteristic pictures to show, in which case the viewer still gets the essence (e.g. the reminder to buy) of the commercial, e.g. from an animation on top of which a couple of words are displayed. When clicking the subwindow, more content can appear, just as with the hierarchical programs/reportages described above. Summarization can be as complex as making a hierarchical cut-list with entry points, so that on-the-fly movies of different durations can be made (e.g. with only two examples of where something went wrong to the main character instead of four, or straightaway jumping to the main message), or it can be so simple as to just tune down the annoying audio, e.g. replacing it with text message(s).

As described above, one of the advantages of embodiments following the invention principles is that a user has easy control over the signal complexity (which is handy when he is already tired or stressed). So during operation, he may use only a single slider 330, to reduce or increase the complexity. But additionally it may be advantageous to have a second slider (340), which controls the hierarchical complexity of the offer program/O(A,V), e.g. the amount of subwindows allowable. If this slider is low, this may result in allowing e.g. only 3 automatic subwindows, of which video only the first 50 seconds is retained, and all the rest is thrown away (it may be actually not stored in the buffer memory on 192, or just not rendered in the output signal, even if a subwindow is selected). The potentially complex audio-video processing underlying the complexity change may advantageously at least partially configured by a viewer according to his likings, either at purchase time or at any time. Thereto a menu 350 allows the user to change some parameters for particular processings, such as e.g. he may constrain the dynamics of the audio so that it doesn't vary to wildly. Typically this will present to him various settings, e.g. by transforming the currently inputted program audio, to arrive at certain dynamics complexities, and ask the user to allocate those to at least some classes ("comfortable" or "little tired", "very uncomfortable" or "really tired", etc.). The same can be done e.g. with the information hierarchy. E.g. some users may have no trouble with having the entire upper half of the picture covered with subwindows, which when clicked display an entire row of subwindows slightly shifted downwards, which can also be clicked, whereas other user may want only a couple of most relevant items displayed, should they want to consult them. So in the end they reduce the news to only a couple of items, e.g. if they see a bombing in Irak they may want to click it, ignoring all the rest.

There are several ways to create a relaxing signal. E.g., in documentaries (e.g. of a city trip, or nature) there is usually a (relatively) fast pace, just to get all the information into the program. However, one would like to savour the visit to the Grand Canyon, or that nice square in Rome, rather than to see it flash by in seconds. Thereto repetitive sequences may be created (e.g. by a single "repetize" button push), and repetitive should not be interpreted as exactly time synchonously ever repeating a temporal segment (e.g. a shot or scene of shots) of the audiovisual signal, but rather creating a signal of a remaining nature (at least for a certain amount of time, e.g. until the "repetize" button is pushed again to undo the function), kind of like a photo/snapshot, but more immersive because of the characteristic motions in the shots. In a simple embodiment this would work by the audiovisual signal processing unit 104 indeed just extracting the particular shot at the time of the button press and continuing it. However, the audiovisual signal processing unit can be arranged do do more complex signal analysis both temporally and spatially, and e.g. analyze the motion of a human, and even track him across two shots, and use this to generate the sequence. E.g., it may create a panoramic stitch of two related shots of the same scenary and extract the moving actors and repaste them with motion estimation/compensation techniques so that they fluidly walk through the new scene. This analysis may typically also be used to create the most relaxing versus informative extract of the captured scenery, e.g. the linearly moving people through the Roman square (wide angle) scene are retained, but a chaotic quick shot (or the end of the scene in a pan ending on a closeby object e.g.) like e.g. a short snippet of a flower salesman shouting will be cut out as it doesn't blend naturally (which typically also shows as annoying when repeating). Furthermore, the temporally nicely cut scene may also be processed spatially, e.g. to morph, extrapolate textures, create signal for ambilight surround etc. Typically if there are several subsnippets, the need not be allocated similar time spans, i.e. they need not be shown at the same speed. E.g. the walking persons on the square may be shown in real time, but the actions of the flower salesman may be slowed down, to make him blend in better with the rest of the scene (e.g. tempo wise, or relaxation/information complexity wise), or make the final to be repeated cut more pleasing/relaxing etc. The skilled person will understand that by adding artificial intelligence and using the different captured audiovisual signal parts, one can create very complex re-renderings of the original scene, e.g. with the people in the square walking new trajectories (dropping some of them, waiting for more time until one walks into the scene, etc.).

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An audiovisual signal processing device, comprising a signal processing unit configured to
   receive a video signal comprising a plurality of images representing at least a part of an original scene having at least first and second video objects, the first video object having motion between at least two of the plurality of images and the second video object having a substantial lack of motion between at least two of the plurality of images;
   identify the at least first and second video objects of the plurality of images;
   select at least one image from the second two of the plurality of images including the second video object; and
   transform the received video signal by inserting the first video object into a plurality of the selected at least one image to create a temporally repeating sequence of the at least one image including the first and second video objects resulting in a change in the part of the original scene, wherein superposition of the first video object in the temporally repeating sequence of the at least one image varies based on the motion of the first video object.

2. The audiovisual signal processing device of claim 1, comprising a selection unit configured to select under viewer control a particular temporal part of the plurality of images to select from, for the least one image.

3. The audiovisual signal processing device of claim 2, wherein the signal processing unit is configured to process the video signal according to metadata describing different temporal subparts of the video signal.

4. The audiovisual signal processing device of claim 1, wherein the signal processing unit is configured to analyze motion in the plurality of images to identify the first and second video objects.

5. The audiovisual signal processing device of claim 1, wherein the signal processing unit is configured to stabilize the first video object in the changed part of the original scene based on determined edges of the first video object.

6. The audiovisual signal processing device of claim 1, wherein the signal processing unit is configured to stabilize the first video object in the changed part of the original scene by performing motion compensated interpolation of the first video object.

7. The audiovisual signal processing device of claim 1, wherein the signal processing unit is configured to determine scene boundaries in the plurality of images to identify the second video object.

8. The audiovisual signal processing device of claim 1, wherein the signal processing unit is configured to identify people in the plurality of images to identify the first video object.

9. The audiovisual signal processing device of claim 1, wherein the signal processing unit is configured to determine at least one of a shot interval, a scene interval, a program interval, a reportage interval, a shot type, a scene type, a program type and a reportage type of the plurality of images to select the at least one image.

10. The audiovisual signal processing device of claim 1, comprising a memory, wherein the signal processing unit is configured to detect a characteristic shot using a spatial histogram of at least a portion of the plurality of images, analyze the plurality of images to identify information of the characteristic shot and store the identifying information of the characteristic shot in the memory.

11. The audiovisual signal processing device of claim 1, wherein the signal processing unit is configured to process the video signal according to metadata describing different temporal subparts of the video signal.

12. The audiovisual signal processing device of claim 1, wherein the first and second video objects of the plurality of images are identified from at least partially overlapping portions of the plurality of images.

13. The audiovisual signal processing device of claim 1, wherein the signal processing unit is configured to identify at least a third video object of the video signal, the third video object having motion between at least two of the plurality of images and to insert the third video object into the plurality of the selected at least one image to create the temporally repeating sequence of the at least one image including the first, second and third video objects.

14. The audiovisual signal processing device of claim 13, wherein a temporal span of the first video object is different than a temporal span of the third video object and the signal processing unit is configured to retime one of the first and third video objects inserted in the temporally repeating sequence.

15. A method of processing a video signal, comprising acts of:
   receiving the video signal comprising a plurality of images representing at least a part of an original scene having at least first and second video objects, the first video object having motion between at least two of the plurality of images and the second video object having a substantial lack of motion between at least two of the plurality of images;
   identifying the at least first and second video objects of the plurality of images;
   selecting at least one image from the plurality of images including the second video object; and
   transforming the received video signal by inserting the first video object into a plurality of the selected at least one image creating a temporally repeating sequence of the at least one image including the first and second video objects resulting in a change in the part of the original scene with superposition of the first video component in the temporally repeating sequence of the at least one image varying based on the motion of the first video object.

16. A non-transitory memory medium containing instructions that when executed by a processor configure the processor to perform a method of processing a video signal, the method comprising acts of:
- receiving the video signal comprising a plurality of images representing at least a part of an original scene having at least first and second video objects, the first video object having motion between at least two of the plurality of images and the second video object having a substantial lack of motion between at least two of the plurality of images;
- identifying the at least first and second video objects of the plurality of images;
- selecting at least one image from the plurality of images including the second video object; and
- transforming the received video signal by inserting the first and second video objects into a plurality of the selected at least one image thereby creating a temporally repeating sequence of the at least one image including the first video object resulting in a change in the part of the original scene with superposition of the first video object in the temporally repeating sequence of the at least one image varying based on the motion of the first video object.

\* \* \* \* \*